United States Patent
Zhu et al.

(10) Patent No.: US 11,687,301 B2
(45) Date of Patent: Jun. 27, 2023

(54) RECORDING MEDIUM

(71) Applicant: BROTHER KOGYO KABUSHIKI KAISHA, Nagoya (JP)

(72) Inventors: Feng Zhu, Nagoya (JP); Keigo Kako, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/725,064

(22) Filed: Apr. 20, 2022

(65) Prior Publication Data

US 2022/0244897 A1 Aug. 4, 2022

Related U.S. Application Data (63) Continuation of application No. 16/834,375, filed on Mar. 30, 2020, now Pat. No. 11,340,850, which is a
(Continued)

(30) Foreign Application Priority Data

Sep. 28, 2016 (JP) .................................. 2016-190335

(51) Int. Cl.
*G06F 3/12* (2006.01)
*G06T 7/73* (2017.01)
(Continued)

(52) U.S. Cl.
CPC .......... *G06F 3/1256* (2013.01); *B41J 3/4075* (2013.01); *G06F 3/1208* (2013.01);
(Continued)

(58) Field of Classification Search
None
See application file for complete search history.

(56) References Cited

U.S. PATENT DOCUMENTS

| 9,106,812 B1 | 8/2015 | Prince et al. |
| 2003/0174866 A1 | 9/2003 | Poynter |

(Continued)

FOREIGN PATENT DOCUMENTS

| JP | 2010-177931 A | 8/2010 |
| JP | 2012-166511 A | 9/2012 |

(Continued)

OTHER PUBLICATIONS

Notice of Allowance dated Jan. 8, 2020 received in U.S. Appl. No. 15/714,127.

(Continued)

*Primary Examiner* — James A Thompson
(74) *Attorney, Agent, or Firm* — Scully, Scott, Murphy & Presser, P.C.

(57) ABSTRACT

The disclosure discloses a non-transitory computer-readable recording medium storing a virtual label display process program for executing steps. The steps include a composite image generating step, a composite image output step, a determining step, and a notifying step. In the composite image generating step, a real image data of a desired field of view and a virtual image data of a label are combined. In the composite image output step, a composite image data is output to a display device, and a virtual image of the label on the display device is superimposed and displayed. In the determining step, it is determined whether a desired suitability is satisfied between an exterior appearance of a background object and an exterior appearance of the label based on the real image data and the virtual image data. In the notifying step, a predetermined suitability notification is made.

6 Claims, 10 Drawing Sheets

Related U.S. Application Data continuation of application No. 15/714,127, filed on Sep. 25, 2017, now Pat. No. 10,649,706.

(51) Int. Cl.
*G06T 11/60* (2006.01)
*G06T 19/00* (2011.01)
*B41J 3/407* (2006.01)
*G06T 11/00* (2006.01)

(52) U.S. Cl.
CPC .......... *G06F 3/1251* (2013.01); *G06F 3/1292* (2013.01); *G06T 7/73* (2017.01); *G06T 11/00* (2013.01); *G06T 11/60* (2013.01); *G06T 19/006* (2013.01); *G06K 2215/0097* (2013.01)

(56) References Cited

U.S. PATENT DOCUMENTS

| | | | |
|---|---|---|---|
| 2007/0262141 A1* | 11/2007 | Ito | G06F 3/126 235/383 |
| 2010/0257210 A1* | 10/2010 | Witkin | G06Q 30/00 705/26.1 |
| 2011/0141141 A1 | 6/2011 | Kankainen | |
| 2013/0119124 A1 | 5/2013 | Rothschild | |
| 2013/0139063 A1 | 5/2013 | Senot et al. | |
| 2014/0022568 A1 | 1/2014 | Nakaya | |
| 2014/0125659 A1 | 5/2014 | Yoshida et al. | |
| 2014/0307269 A1 | 10/2014 | Hirabayashi et al. | |
| 2015/0206310 A1 | 7/2015 | Okada et al. | |
| 2015/0332500 A1 | 11/2015 | France | |
| 2016/0247323 A1 | 8/2016 | Shimazaki | |
| 2016/0342579 A1 | 11/2016 | Graf | |
| 2016/0357996 A1 | 12/2016 | Yamashita | |
| 2017/0263029 A1 | 9/2017 | Yan et al. | |
| 2019/0371064 A1 | 12/2019 | Anderson | |

FOREIGN PATENT DOCUMENTS

| | | |
|---|---|---|
| JP | 2012-208571 A | 10/2012 |
| JP | 2014-203423 A | 10/2014 |
| JP | 2015-082237 A | 4/2015 |

OTHER PUBLICATIONS

Office Action dated Jul. 25, 2019 received in U.S. Appl. No. 15/714,127.
Office Action dated Oct. 26, 2018 received in U.S. Appl. No. 15/714,127.
Office Action dated Sep. 3, 2020 received in U.S. Appl. No. 16/834,375.
Office Action dated Feb. 9, 2021 received in U.S. Appl. No. 16/834,375.
Notice of Reasons for Refusal dated May 7, 2021 received in Japanese Patent Application No. JP 2020-065348 together with an English language translation.
Notice of Reasons for Refusal dated May 7, 2021 received in Japanese Patent Application No. JP 2020-065349 together with an English language translation.
Notice of Reasons for Refusal dated May 7, 2021 received in Japanese Patent Application No. JP 2020-065350 together with an English language translation.
Office Action dated Jul. 22, 2021 received in U.S. Appl. No. 16/834,375.
Notice of Allowance dated Jan. 20, 2022 received in U.S. Appl. No. 16/834,375.

* cited by examiner

RECORDING MEDIUM

CROSS-REFERENCE TO RELATED APPLICATION

This application is a continuation application of U.S. application Ser. No. 16/834,375 filed on Mar. 30, 2020, which is a continuation of U.S. application Ser. No. 15/714,127 filed on Sep. 25, 2017, now U.S. Pat. No. 10,649,706 issued on May 12, 2020, which claims benefit of Japanese Patent Application No. 2016-190335, which was filed on Sep. 28, 2016, the disclosure of which is incorporated herein by reference in its entirety.

BACKGROUND

Field

The present disclosure relates to a recording medium storing a virtual label display process program executed by an operation terminal operating a label producing device.

Description of the Related Art

Techniques of producing a label pasted and used on an object to be affixed through operation of a label producing device from an operation terminal are well known. In this kind of techniques, a print image of a label to be produced is displayed on a display monitor included in an operation terminal such as a personal computer (PC). When an operator performs an operation to input characters, graphics, etc. while viewing the image display, the corresponding print data is generated in the operation terminal and transmitted to the label producing device. As a result, a print corresponding to the print data is performed on a transported tape by a thermal head in the label producing device, and a label is produced. In another known technique, a printed image to be posted suitable for a positing place is easily produced based on environmental information in a place where a label is planned to be posted.

In the prior arts described above, when a label is actually produced, an operator judges the suitability to the environment in which the label is planned to be pasted. Therefore, it is disclosed that "the place to paste the label is already decided and printing contents (template) suitable to the place are determined". However, print data may be produced in advance when a multiplicity of objects to be affixed exists, for example, as in the case of fixtures in a workplace, personal belongings brought to a school, etc. In this case, since the print data is produced before determining where a label is pasted, the suitability cannot be judged between the produced label and a place to paste the label. Therefore, needs for simulation cannot be met when "a label (including printing contents) is already decided and a label pasting place suitable for the label is determined".

SUMMARY

An object of the present disclosure is to provide a recording medium storing a virtual label display process program capable of finding a most suitable place to paste a label by using print data for a label produced in advance and capable of improving convenience for a user.

In order to achieve the above-described object, according to the aspect of the present application, there is provided a non-transitory computer-readable recording medium capable of reading by a computing device, storing a virtual label display process program for executing steps on the computing device, the computing device provided in a portable terminal that is configured to operate a label producing device configured to produce an attachable label and includes an operation device, an imaging device, a display device, and the computing device, the steps comprising a virtual image generating step for generating virtual image data of the label, a real image acquiring step for acquiring real image data of a desired field of view photographed by the imaging device, a composite image generating step for combining the real image data acquired in the real image acquiring step and the virtual image data generated in the virtual image generating step to generate composite image data, a composite image output step for outputting the composite image data generated in the composite image generating step to the display device, and superimposing and displaying a virtual image of the label in an image of the desired field of view on the display device, a determining step for determining whether a desired suitability is satisfied between an exterior appearance of a background object included in the desired field of view and an exterior appearance of the label based on the real image data acquired in the real image acquiring step and the virtual image data generated in the virtual image generating step, and a notifying step for making a predetermined suitability notification in the case that it is determined that the suitability is satisfied in the determining step.

The virtual label display process program of the present disclosure is used for finding a most suitable place to paste a label to be produced by a user. In particular, when the virtual label display process program is executed by the computing device of the portable terminal, the virtual image data is first generated (virtual image generating step). This virtual image data may reflect a result of an editing operator performed on an appropriate editing screen through the operation device by the user or may be the print data of the label completed in advance, for example. When the user then photographs a desired field of view including an object to be affixed with the imaging device of the portable terminal, the real image data corresponding to the photographed result is acquired (real image acquiring step). As a result, the generated virtual image data and the acquired real image data are then combined (composite image generating step) and the composite image data is output to the display device (composite image output step). Therefore, the virtual image of the label is displayed in an overlapped state in the image of the desired field of view on the display device, so that the user can easily have a visual image of a virtual appearance form when the label is attached to the object to be affixed in the image of the field of view.

The portable terminal of the present disclosure can determine the desired suitability between the exterior appearance of the object to be affixed and the exterior appearance of the label pasted thereon. It is conceivable that examples of the suitability include whether the label looks clearly floating up when the label is attached to the object to be affixed (a degree of clarity as a feeling of sharpness) or, conversely, whether the label looks moderately buried when the label is attached to the object to be affixed (a degree of being buried as a feeling of inconspicuousness), etc. In the present disclosure, based on the real image data and the virtual image data, it is determined at the determining step whether the desired suitability is satisfied. If the determination is affirmative, suitability notification is made at the notifying step to notify the user that the suitability is satisfied.

As a result of the process as described above, the user can move the portable terminal or move around with the portable terminal held by hand to take images of various places while displaying the virtual image of the label to be produced displayed on the display device, so as to find the most suitable place to paste the label. Consequently, the convenience for the user can be improved.

DETAILED DESCRIPTION OF THE PREFERRED EMBODIMENTS

An embodiment of the present disclosure will now be described with reference to the drawings.

Figure 1A:
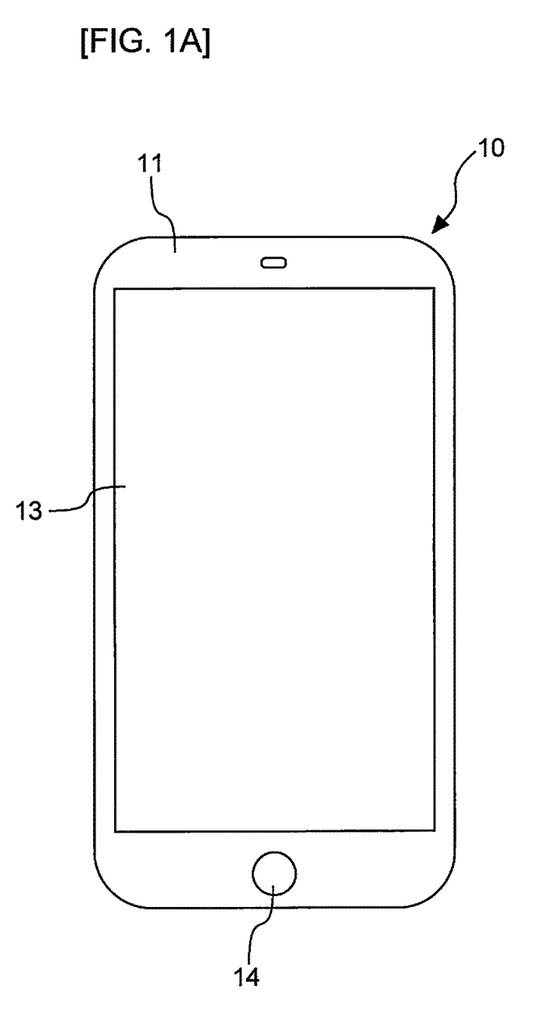
FIG. 1A is a front view showing an exterior appearance of an operation terminal executing a virtual label display process program.
Figure 1B:
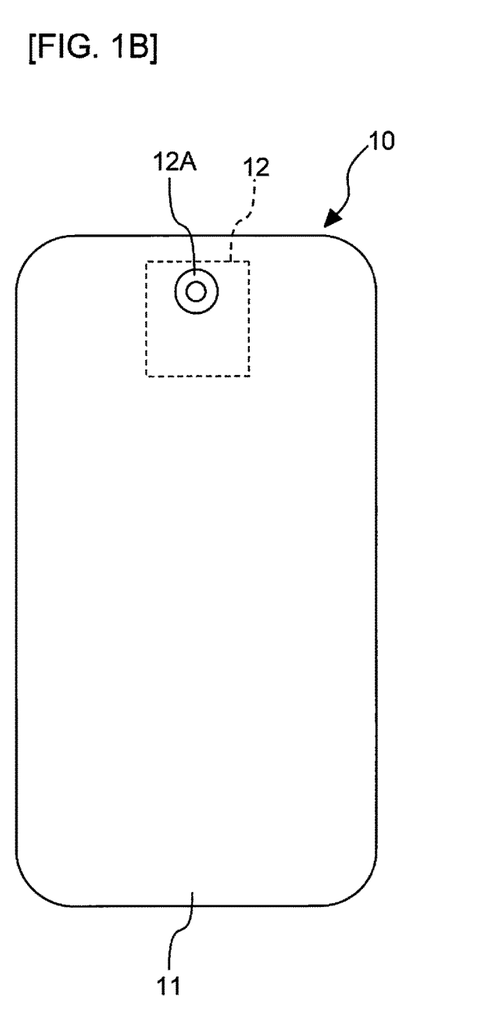
FIG. 1B is a back view showing the exterior appearance of the operation terminal executing the virtual label display process program.

In FIGS. 1A and 1B, a portable terminal 10 has a device main body 11 and an imaging part 12 having a camera function.

The device main body 11 includes a display part 13 made up of, for example, a touch-panel type color liquid crystal display, displaying various pieces of information and various messages, and allowing an operator to perform various operations, and an operation part 14 such as an operation button that the operator can operate.

The imaging part 12 is disposed to an upper portion (upper portions of FIGS. 1A and 1B) of the device main body 11 and includes a camera lens 12A on the side opposite to a surface on which a display surface of the display part 13 is disposed, i.e., on the back side. For example, when the operator operates the operation part 14 to display an appropriate icon etc. on the display part 13 and selects the icon by pressing the icon with a finger, the imaging part 12 is activated by a touch panel function, and an object can be photographed (a moving image or a still image can selectively be photographed).

Figure 2:
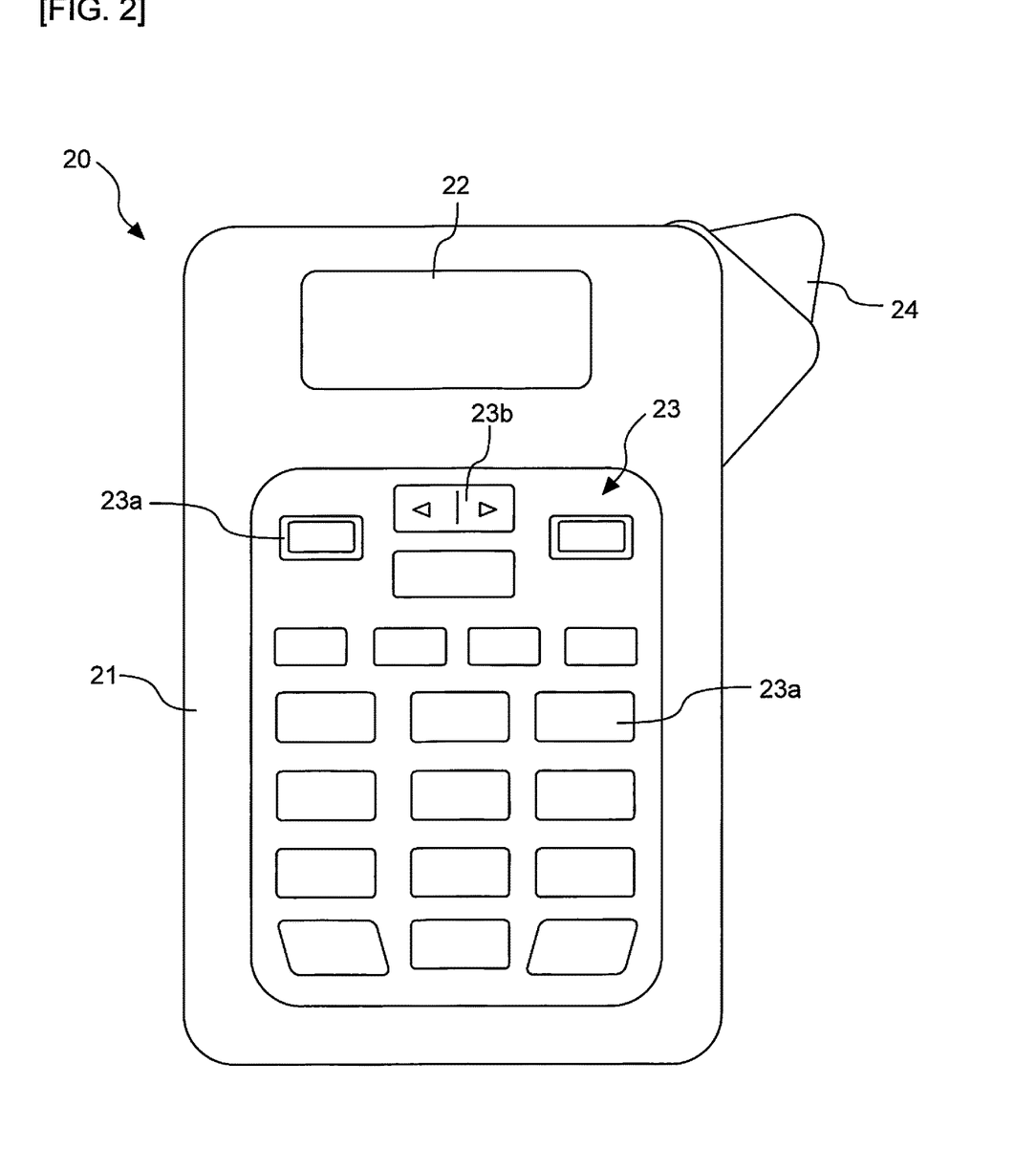
FIG. 2 is a front view showing an exterior appearance of a label producing device that is an operation object of the operation terminal.

In FIG. 2, a label producing device 20 has a device main body 21. The device main body 21 includes, for example, a display part 22 made up of a liquid crystal display and displaying various pieces of information and various messages, an operation part 23 having a plurality of button switches etc. allowing an operator to perform various operations, and a lever 24 for driving a cutter 31 (see FIG. 3 described later) disposed inside the device main body 21.

The operation part 23 includes various function keys 23a including input keys for inputting characters, symbols, numbers, etc., movement keys 23b functioning as movement keys for a cursor position at the time of character input and transition keys at the time of mode selection, etc. The operation part 23 can allow one key to provide a plurality of functions.

Figure 3:
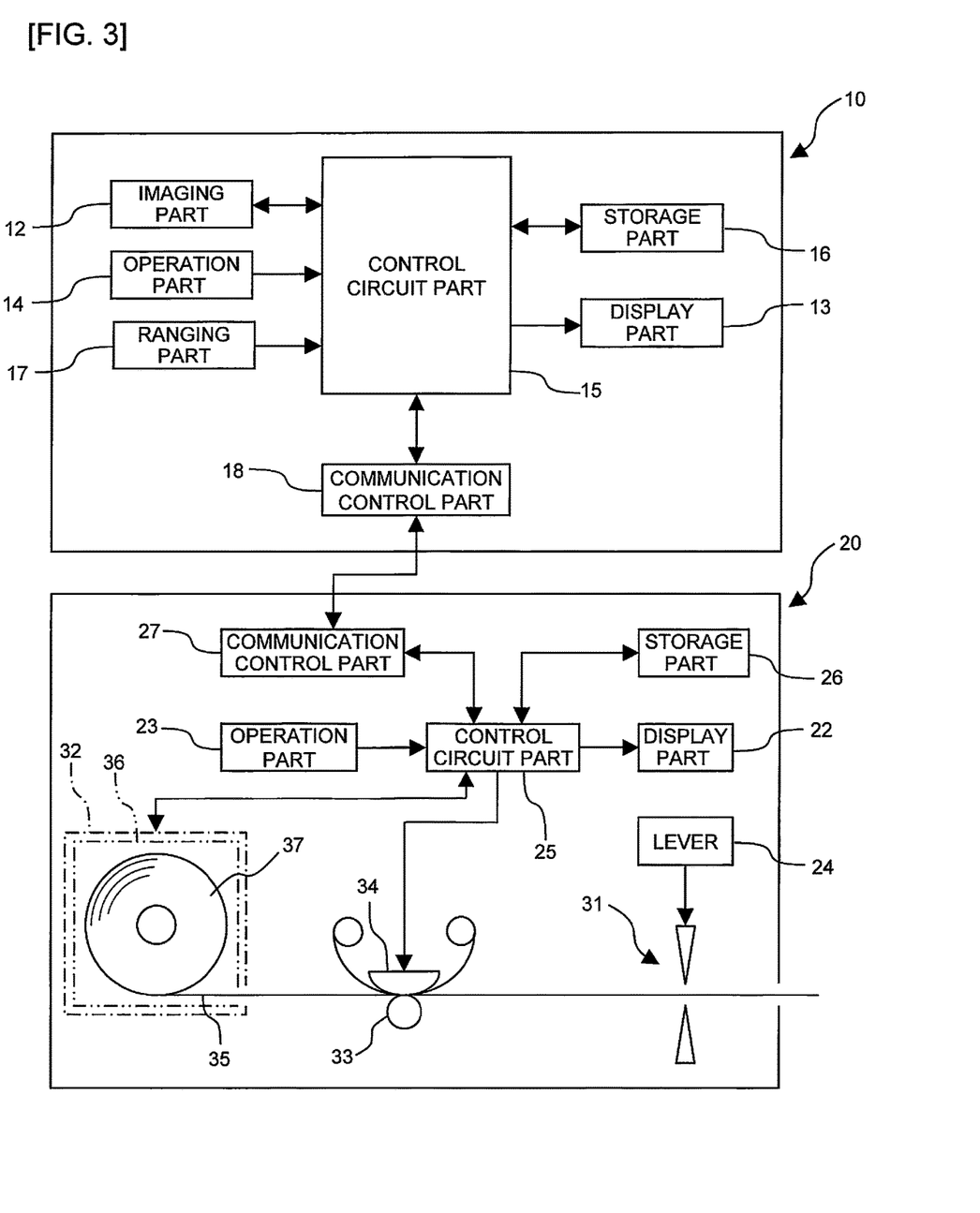
FIG. 3 is a functional block diagram showing functional configurations of the operation terminal and the label producing device.

In FIG. 3, the portable terminal 10 includes, in addition to the imaging part 12, the display part 13, and the operation part 14 described above, a control circuit part 15, a storage part 16 for storing various pieces of information, a ranging part 17 for distance measurement etc. usable for focusing etc., when using the camera function, and a communication control part 18.

The control circuit part 15 includes a CPU, a RAM, and a ROM not shown. This control circuit part 15 executes various programs stored in advance in the ROM while using a temporary storage function of the RAM by an arithmetic function of the CPU. These various programs include a virtual label display process program of the present disclosure. The control circuit part 15 is connected via the communication control part 18 to the label producing device 20 through a wireless communication and can transmit/receive various pieces of information and various data to/from the label producing device 20.

The storage part 16 is made up of, for example, a nonvolatile memory such as an electrically erasable programmable read-only memory (EEPROM) in which storage contents can be added and erased. This storage part 16 stores various programs for production of a label L and suitability determination (see a flow described later) using the camera function, in addition to the virtual label display process program related to the present disclosure executed by (the CPU of) the control circuit part 15.

The communication control part 18 controls information communication performed with the label producing device 20 connected wirelessly.

In FIG. 3, the label producing device 20 includes, in addition to the display part 22, the operation part 23, the lever 24, and the cutter 31 described above, a control circuit part 25, a storage part 26 storing various pieces of information, a communication control part 27, a cartridge holder 32, a feeding device 33, and a printing head 34.

The control circuit part 25 includes a CPU, a RAM, and a ROM not shown. This control circuit part 25 executes various programs stored in advance in the ROM while using a temporary storage function of the RAM. As a result, the control circuit part 25 generally controls the label producing device 20. The control circuit part 25 is connected to the portable terminal 10 via the communication control part 27 and can transmit/receive various data to/from the portable terminal 10.

The storage part 26 is made up of, for example, a nonvolatile memory such as an electrically erasable programmable read-only memory (EEPROM) in which storage contents can be added and erased. The storage part 26 can store print data transmitted from the portable terminal 10.

The communication control part 27 controls information communication performed with the portable terminal 10 connected wirelessly as described above.

The cartridge holder 32 is configured to attach and detach a cartridge 36 capable of supplying a print-receiving tape 35. The cartridge 36 includes a tape roll 37 (shown as concentric circles in a simplified manner although actually having a spiral shape) having the print-receiving tape 35 wound around a reel member not shown. The cartridge holder 32 acquires tape color information (tape color and tape width) of the set cartridge 36 and transmits the information to the control circuit part 25.

The feeding device 33 is disposed facing the printing head 34. This feeding device 33 is controlled by the control circuit part 25 to transport the print-receiving tape 35 supplied from the cartridge 36 mounted on the cartridge holder 32, i.e., fed out from the tape roll 37 of the cartridge 36.

The printing head 34 is controlled by the control circuit part 25 to perform a desired print on the print-receiving tape 35 fed out from the tape roll 37 and transported by the feeding device 33.

When the lever 24 is operated by the operator, the cutter 31 cuts the print-receiving tape 35 after completion of the print by the printing head 34 in a predetermined length to form one printed label L (see FIG. 5 described later).

Procedures of producing the label L by the label producing device 20 will be described with reference to FIG. 4.

Figure 4:
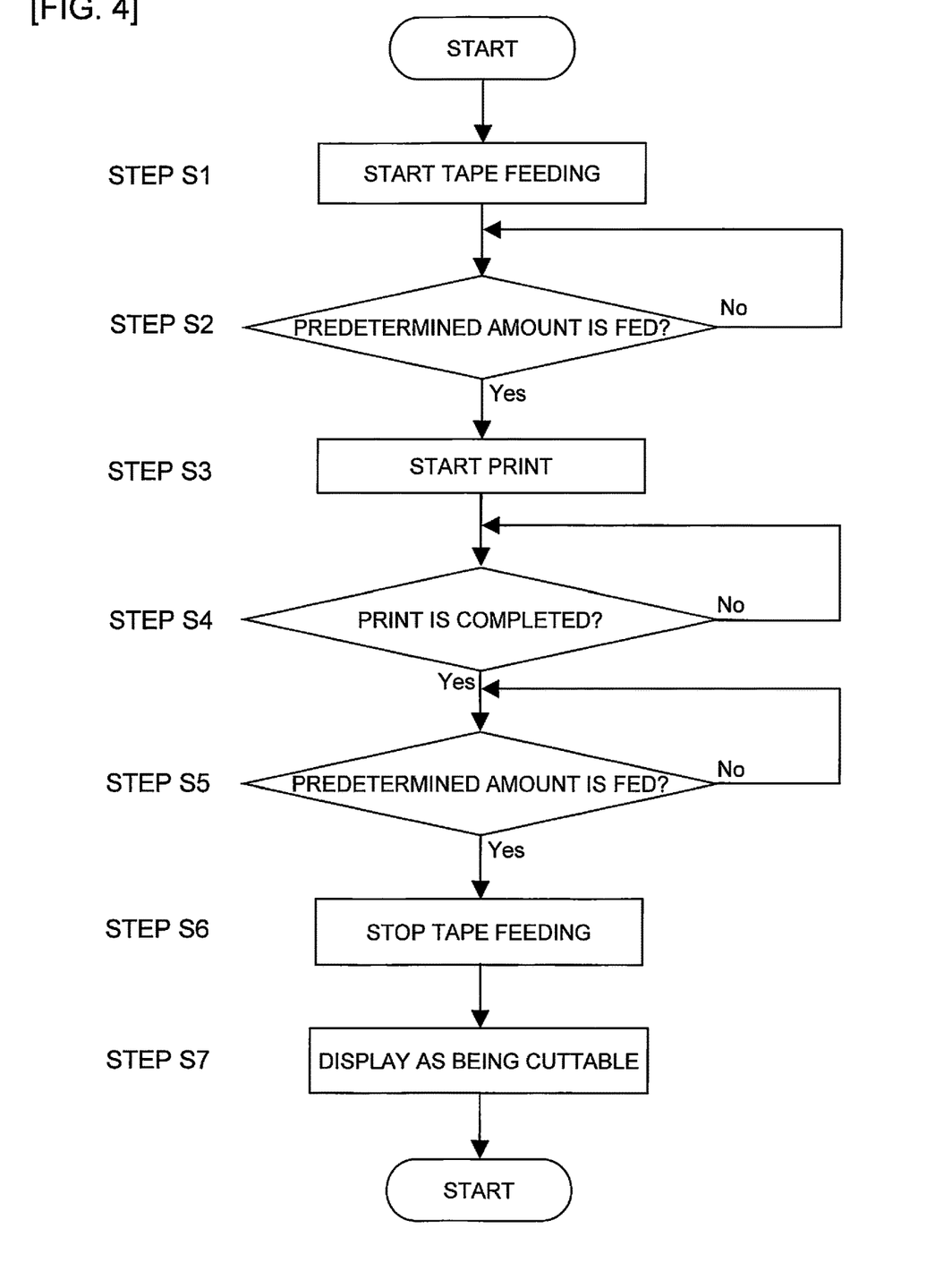
FIG. 4 is a flow showing control procedures related to label production executed by a control circuit of the label producing device.

In FIG. 4, a process shown in this flow starts when the portable terminal 10 outputs a label production instruction to the label producing device 20 ("START" position). First, at step S1, the control circuit part 25 outputs a control signal to the feeding device 33 to start feeding-out of the print-receiving tape 35 from the tape roll 37 of the cartridge 36 mounted on the cartridge holder 32, i.e., transporting of the print-receiving tape 35.

The flow goes to step S2, and the control circuit part 25 determines whether a predetermined amount of the print-receiving tape 35 is transported. The predetermined amount is, for example, a transport distance (a so-called transport amount for a front margin) allowing a leading end of a print area not shown of the print-receiving tape 35 to reach a position substantially facing the printing head 34. The determination of step S2 is negative (step S2:NO) during waiting in a loop until the predetermined amount is transported and, when the predetermined amount is transported, the determination of step S2 becomes affirmative (step S2:YES), and the flow goes to step S3.

At step S3, the control circuit part 25 outputs a control signal to the printing head 34 to start a print of print data stored in the storage part 26 onto the print area of the print-receiving tape 35 transported by the feeding device 33.

Subsequently, at step S4, the control circuit part 25 determines whether all the print of the print data onto the print area of the printing-receiving tape 35 by the printing head 34 started at step S3 is completed. The determination of step S4 is negative (step S4:NO) during waiting in a loop until all the print is completed and, when all the print is completed, the determination of step S4 becomes affirmative (step S4:YES), and the flow goes to step S5.

At step S5, the control circuit part 25 determines whether a predetermined amount of the print-receiving tape 35 (e.g., a transport distance allowing all the print area to exceed the cutter 31 by a predetermined length. a so-called transport amount for a rear margin) is further transported. The determination of step S5 is negative (step S5:NO) during waiting in a loop until the predetermined amount is transported and, when the predetermined amount is transported, the determination of step S5 becomes affirmative (step S5:YES), and the flow goes to step S6.

At step S6, the control circuit part 25 outputs a control signal to the feeding device 33 to stop the feeding-out of the print-receiving tape 35 from the tape roll 37 started at step S2, i.e., the transporting of the print-receiving tape 35.

At step S7, the control circuit part 25 outputs a display signal to the display part 22 to perform display indicating that the print-receiving tape 35 can be cut by operating the lever 24. Subsequently, the process shown in this flow is terminated. When the operator operates the lever 24 in accordance with the display, the cutter 31 is actuated and the print-receiving tape 35 is cut. Because of this cutting by the cutter 31, a portion printed by the printing head 34 is separated from the print-receiving tape 35 as the one label L.

Figure 5:
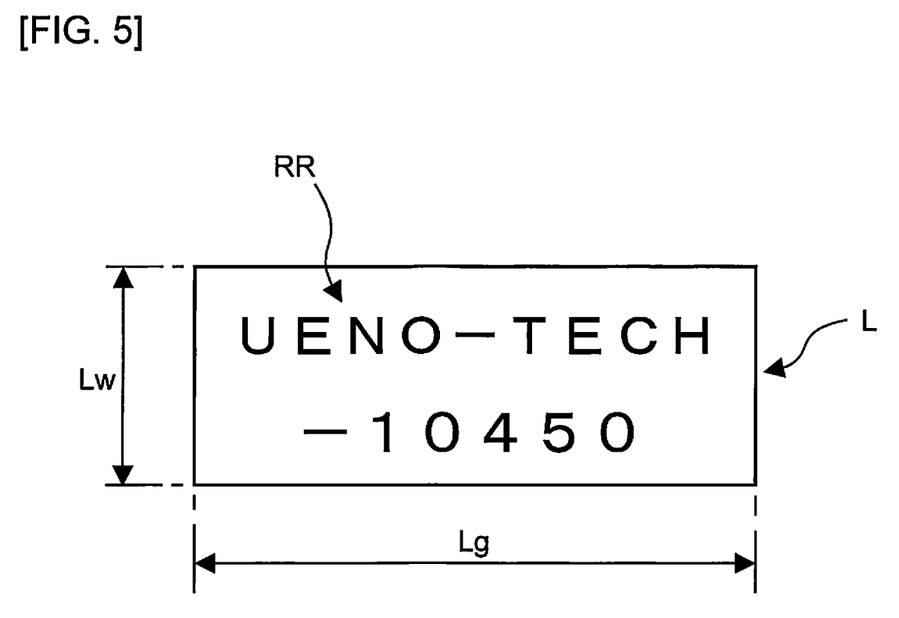
FIG. 5 is a front view showing an example of an exterior shape of a produced label.

As shown in FIG. 5, the label L produced as described above is a rectangular label having a width Lw and a length Lg. In this example, a print RR (character string "VENO-TECH-10450") corresponding to the print data is printed on a surface of the label L.

In the basic configuration described above, the present embodiment is characterized in that before the label producing device 20 actually produces the label L as shown in FIG. 5, the portable terminal 10 displays a virtual label appearance equivalent to the label L (hereinafter appropriately referred to as a "virtual label") together with an image of a background object photographed by the imaging part 12 so as to allow the portable terminal 10 to determine the suitability regarding whether it is preferable to actually paste the label L on the background object. The details will hereinafter be described in order.

<Transition in Display State of Screen>

Figure 6:
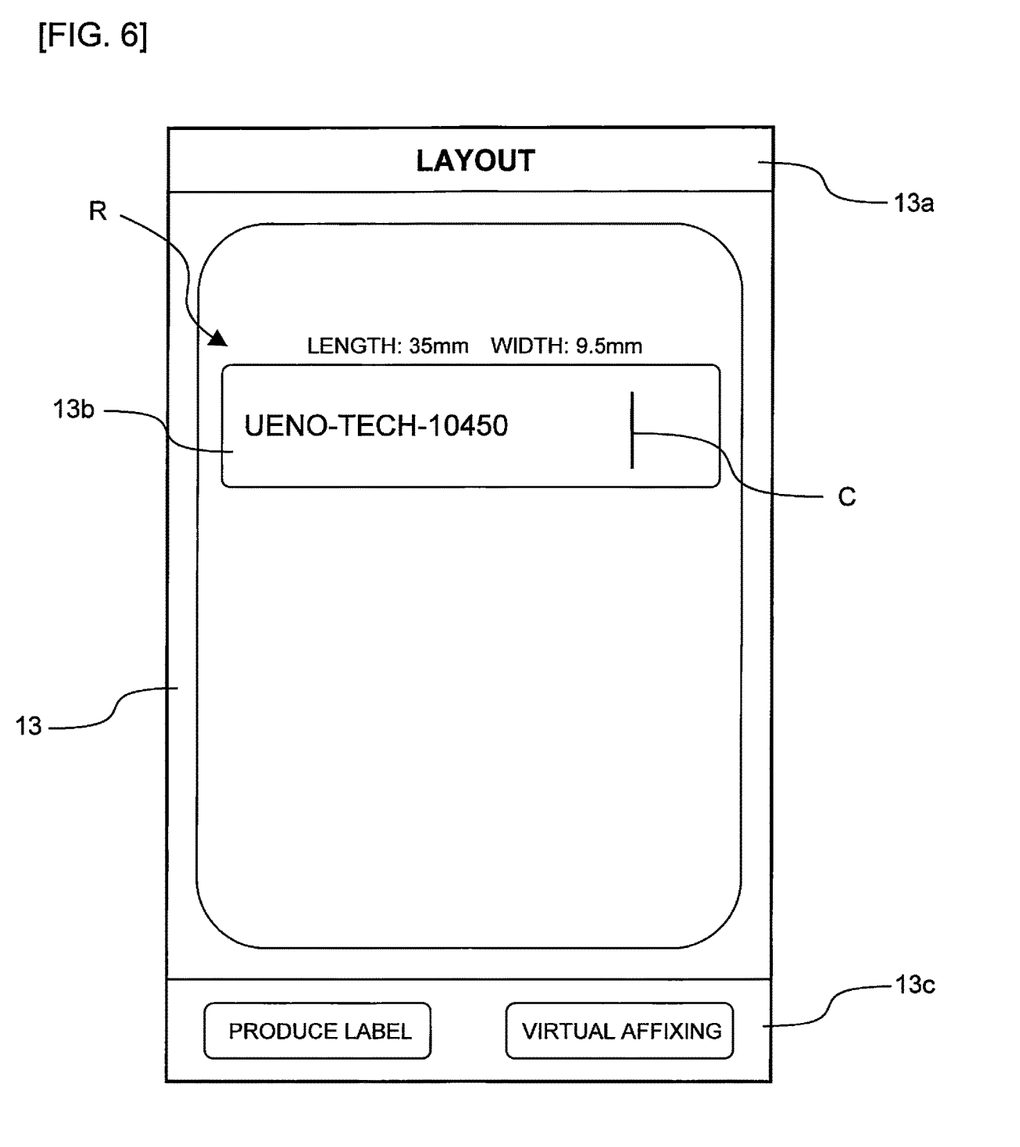
FIG. 6 is an explanatory view showing a layout screen of print data of a label.

First, the operator performs appropriate operational input through the display part 13 and the operation part 14 to display a "layout" screen shown in FIG. 6 on a screen of the display part 13. This "layout" screen on the screen of the display part 13 has a work content display field 13a displaying characters "layout", a print data entry field 13b imitating a print tape and displaying print data R such as input characters, and an operation button field 13c displaying a "produce label" button and a "virtual affixing" button operated as switches through the touch panel function.

While this "layout" screen is displayed, the operator inputs desired text characters as shown in FIG. 6 (the character string "VENO-TECH-10450 . . . " in the shown example. a cursor C is displayed at the end) by an operation such as tracing and writing characters with a finger by using the touch panel function inside (or, conversely, outside) of the print data entry field 13b so as to set the print data R.

At this time, the length of the label L is set by the control circuit part 15 in accordance with the contents (e.g., the number of characters) of this print data R. The width of the label L is fixedly defined in advance or is set by the same operator's operation as described above in an entry field (or a different screen, window, etc.) not shown. In this example, the length dimension and the width dimension of the label L are 35 mm and 9.5 mm, respectively, which are displayed on the screen of the display part 13 outside and near the print data entry field 13b. The contents of the print data R of the label L set by such an editing operation and the length dimension/width dimension of the label L are stored in the storage part 16.

After completion of the editing operation, the operator presses (touches) the "produce label" button in the operation button field 13c to transmit the print data R generated as described above via the communication control part 18 to the label producing device 20. As a result, the flow shown in FIG. 4 is executed, and the label producing device 20 produces the label L on which the print RR corresponding to the print data R is printed as shown in FIG. 5.

On the other hand, after completion of the editing operation, the operator presses the "virtual affixing" button in the operation button field 13c. As a result, the screen of the display part 13 is switched to a "virtual label display" screen shown in FIG. 7. This "virtual label display" screen on the screen of the display part 13 has the work content display field 13a displaying characters "virtual label display", a virtual label LI displayed thereon, and the operation button field 13c displaying a video icon operated as a switch through the touch panel function. The video icon is pressed (touched) at the start/end of photographing of a moving image. In this case, a camera icon for photographing a still image may be displayed instead of this video icon, or the video icon and the camera icon may be displayed.

Figure 7:
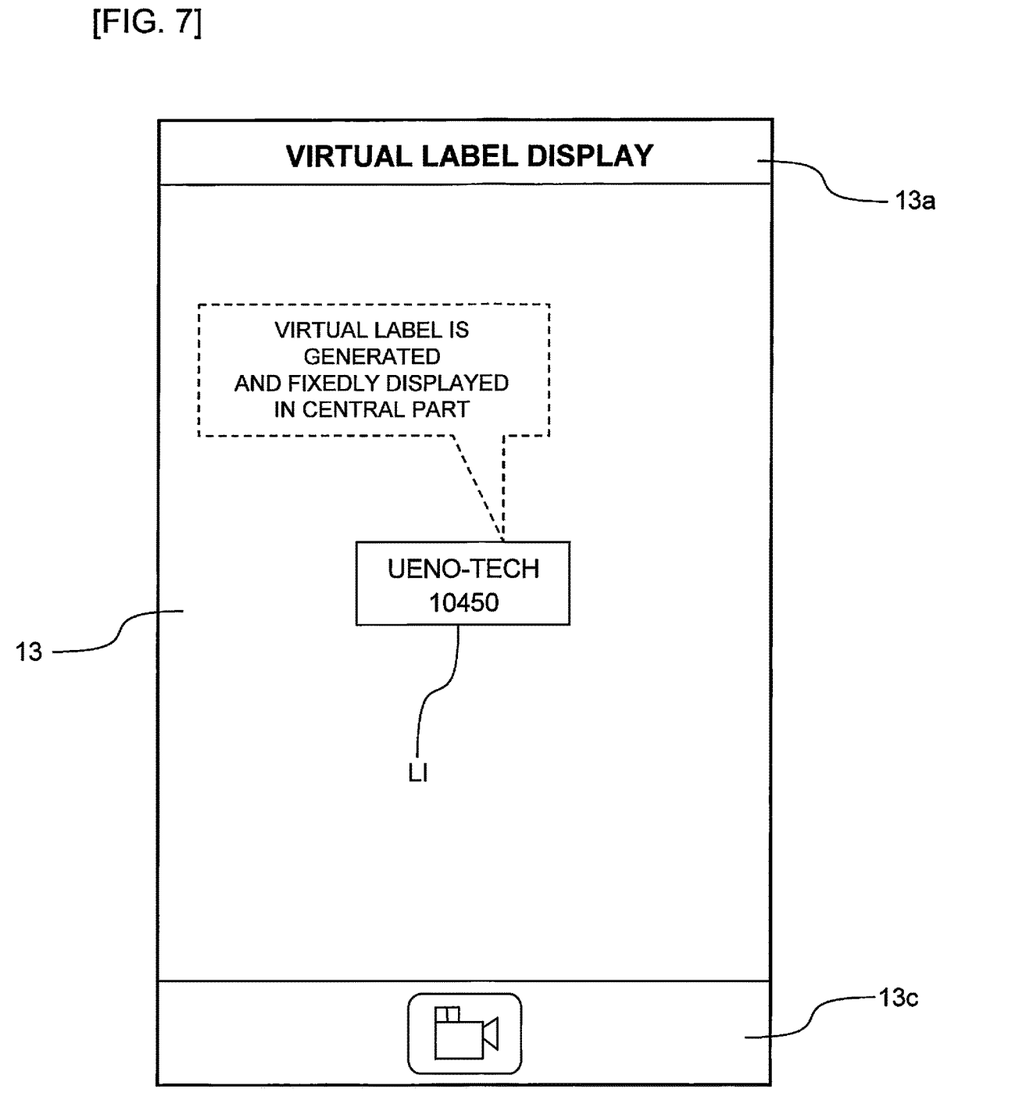
FIG. 7 is an explanatory view showing a virtual label display screen.

The switched "virtual label display" screen displays the virtual label LI reflecting the editing operation on the "layout" screen of FIG. 6, i.e., an image of the label L to be actually produced, in a desired size in a central part on the screen of the display part 13. In this case, the display position of the virtual label LI is fixed on the "virtual label display" screen. The operator then utilizes the camera function of the portable terminal 10 to locate an intended object to be affixed to which the actual label L is attached, i.e., a background object for which the suitability is determined (e.g., an electric pot P described later), at a position falling within the field of view of the imaging part 12 and presses the video icon in the operation button field 13c. As a result, the imaging part 12 starts photographing a moving image of the object to be affixed (the background object. the same applies hereinafter).

Figure 8A:
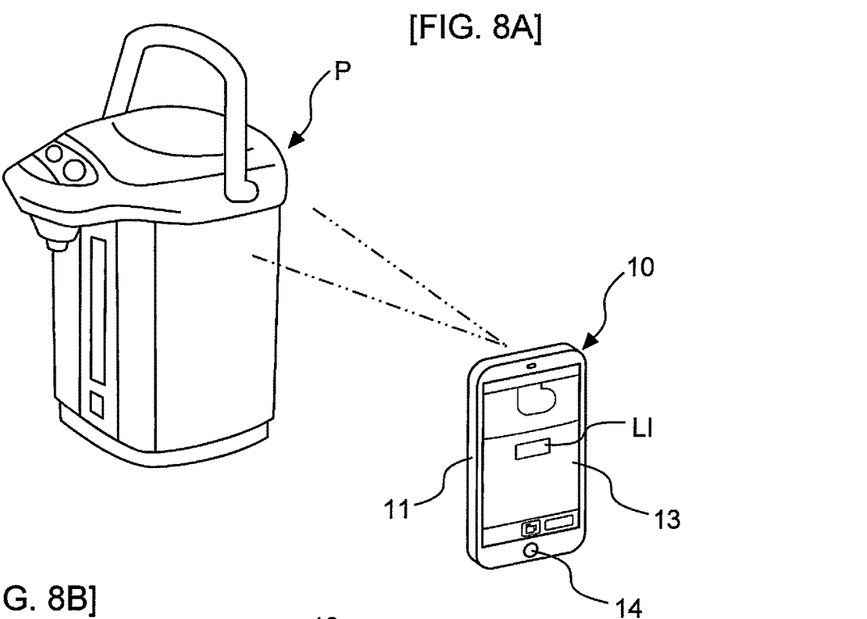
FIG. 8A is an explanatory view of an imaging state at the time of composite display of a virtual label image and an object real image.
Figure 8B:
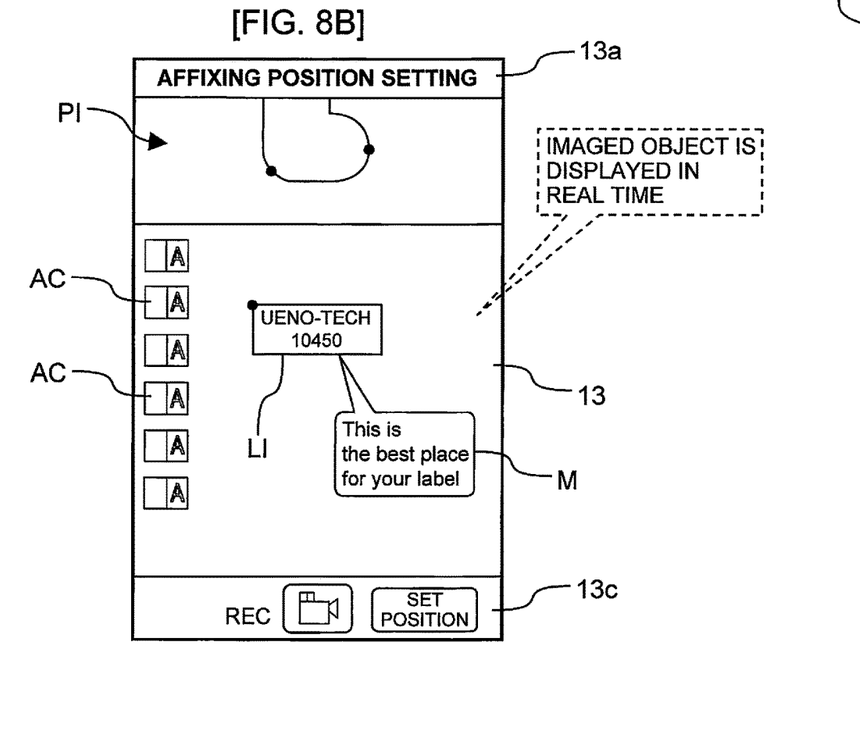
FIG. 8B is an explanatory view of an affixing position setting (searching) screen in which an imaged object real image and a virtual label image are compositely displayed at the time of composite display of the virtual label image and the object real image.

FIGS. 8A and 8B show an example of a display state of the display part 13 after the photographing of the moving image is started in this way. For example, when the object to be affixed (e.g., the electric pot P) is photographed as an object by the imaging part 12 as shown in FIG. 8A, an "affixing position setting (searching)" screen is displayed as shown in FIG. 8B such that a photographed real image (hereinafter appropriately simply referred to as an "object image PI") is overlapped with the virtual label LI as the background of the virtual label LI. During photographing, a "REC" mark is displayed in the vicinity of the video icon in the operation button field 13c for notification of recording in progress. The notification may be made in any form as long as it can be recognized that recording is in progress.

When the operator holding the portable terminal 10 by hand changes the positional relationship with the object to be affixed, the position and the size of the object image PI displayed on the screen of the display part 13 also change in real time; however, the virtual label LI is continuously fixedly displayed and maintained in the desired size in the central part. This enables the control circuit part 15 of the portable terminal 10 to determine the suitability in consideration of the relative positional relationship between the object image PI and the virtual label LI, in terms of the suitability that "the produced label L is preferably (conspicuously/inconspicuously) attached to this place of the object", by replacing the virtual label LI on the object image PI through virtual affixing.

In this case, the screen of the display part 13 displays a plurality of color selection icons AC each having a pair of a tape color and a character color such that the color of characters and the tape color of the generated virtual label LI can be changed. The color selection icons AC are pairs of preset character colors and tape colors. The color selection icons AC are arranged such that the operator can make a selection by appearance. For example, the colors of the tape color on the left side and the colors of the character color on the right side are displayed in a list format on the display part 13. Icon information for displaying these color selection icons AC on the display part 13 can be included in an application. In this case, the portable terminal 10 may acquire the information from the label producing device 20 as a part of update information of the application, for example. Alternatively, for example, the portable terminal 10 may cause the label producing device 20 to identify through the cartridge holder 32 the type of the cartridge 36 set in the cartridge holder 32, before acquiring the current tape color information (the tape color and the tape width). As a result, the portable terminal 10 can make the icon display corresponding to the color of the currently mounted tape different from (e.g., larger than) the other icon display out of the color selection icons AC on the display part 13 so that the operator can recognize the display. In this way, for example, the control circuit part 15 of the portable terminal 10 determines the suitability in terms of whether it is preferable to attach the label L to the object based on compatibility of the tape color and the character color of the virtual label LI with the color of the photographed object image PI etc., and makes a notification at least when a preferably determination result is acquired (details will be described later).

In such a basic configuration, when the label L to be printed is completed as the print data R, and the contents such as characters and graphics to be printed and the shape/exterior appearance such as the color and the size of the print-receiving tape 35 are already decided, the operator can move while photographing with the portable terminal 10 such as a camera-equipped smartphone and display the virtual image of the label L (the virtual label LI) superimposed on the photographed background image in real time, so as to perform a simulation for searching around for a most suitable position to paste the label L. As a result, when the control circuit part 15 determines that the suitability is high (or determines a degree of the suitability) by comparing the color information of the background image changing every moment with the color information of the label, this determination is displayed as a message M or the operator is notified by sound or vibration, so that the most suitable place to paste the label can be found, and the convenience for a user can be improved.

For example, the control circuit part 15 has sample data indicative of the suitability of color coordination stored in a table format etc. in the storage part 16 and can utilize the stored sample data to determine the suitability between the virtual label LI and the object image PI. The hue of the object can be recognized by a two-dimensional color charge-coupled device (CCD) disposed on the imaging part 12.

<Details of Control>

The details of control performed by the control circuit part 15 (specifically, the CPU) so as to implement the display contents (simulation) as described above will be described with reference to a flowchart of FIG. 9.

Figure 9:
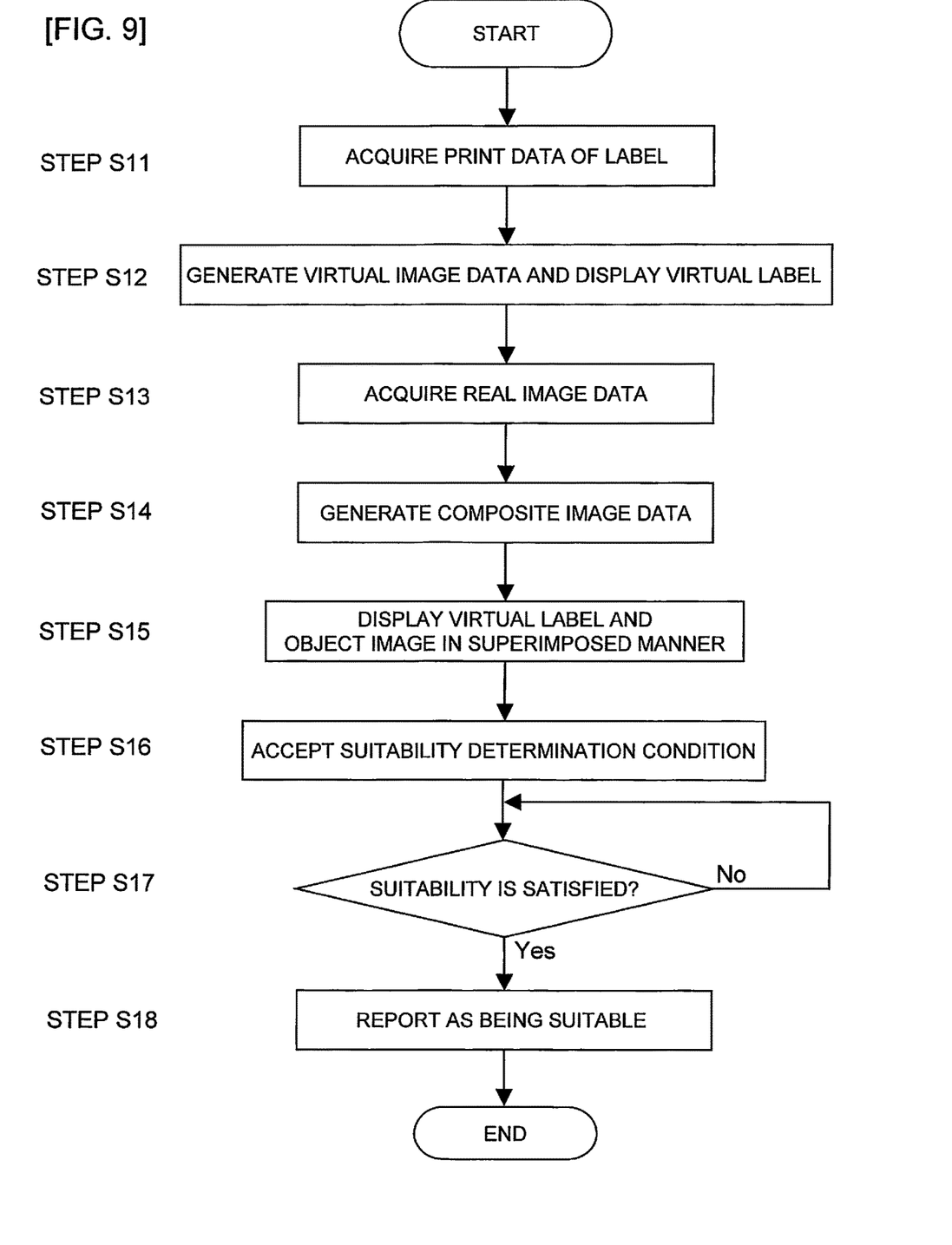
FIG. 9 is a flowchart showing control procedures executed by a control circuit of the operation terminal.

In FIG. 9, first, at step S11, the control circuit part 15 outputs a display signal to the display part 13 to display the "layout" screen as a screen for operation and editing (see FIG. 6) and then acquires the print data R in accordance with contents of operational input by the operator for producing or editing the label L. Subsequently, the flow goes to step S12 in response to the operation of the "virtual affixing" button described above. If the operator does not produce or edit the label L, i.e., if the already produced print data R is used, the print data R may simply be acquired from the storage part 16. In such a case that the print RR etc. of the label L are fixedly defined (by using a template etc.) or that the production/editing is performed by using another device, the routine of the control circuit part 15 related to the production/editing operation at step S11 is eliminated and, for example, the print data R including the current tape color information is acquired.

At step S12, the control circuit part 15 generates virtual image data for displaying the virtual label LI corresponding to the image of the label L on the screen of the display part 13 based on the print data R including the current tape color information acquired at step S11, and goes to step S13. The generated virtual image data is output to the display part 13 and the virtual label LI is displayed on the screen of the display part 13 (see FIG. 7).

At step S13, the control circuit part 15 acquires real image data (including image data of the object image PI) of a desired field of view including the object (electric pot P) photographed by the operator with the imaging part 12. Subsequently, the flow goes to step S14.

At step S14, the control circuit part 15 combines the virtual image data generated at step S12 and the real image data acquired at step S13 to generate composite image data. Subsequently, the flow goes to step S15.

At step S15, the control circuit part 15 outputs the composite image data generated at step S14 to the display part 13 for superimposing and displaying the virtual label LI and the object image PI on the screen of the display part 13 (see FIGS. 8A and 8B).

The flow goes to step S16 and the control circuit part 15 accepts setting of a mode at the time of causing the control circuit part 15 to determine the suitability through the operator's operation of the portable terminal 10 and uses the setting as at least a portion of conditions for making the suitability determination in accordance with the accepted mode.

For example, if the control circuit part 15 includes a known image recognition process function, the real image data acquired at step S13 is analyzed to extract at least two points having features different the other positions, such as a contour, an edge portion, recess and protrusion portions, a corner portion, and a black portion, so as to set feature points. In this example, two points of a handle portion of the electric pot P are set as feature points in the object image PI (see FIGS. 8A and 8B). These feature points may also be set arbitrarily to desired points by the operator through an appropriately operation on the screen of the display part 13 in the same way as described above.

The flow goes to step S17 and, on the basis of the conditions corresponding to the mode set at step S16, the control circuit part 15 determines whether the desired suitability is satisfied between the exterior appearance of the object to be affixed and the exterior appearance of the label L based on the virtual image data of the virtual label LI generated at step S12 and the real image data acquired at step S13. If determining that the desired suitability is satisfied, the control circuit part 15 goes to step S18. On the other hand, if determining that the desired suitability is not satisfied, the control circuit part 15 repeats this routine until determining that the suitability is satisfied. However, the control circuit part 15 terminates this routine if the operator performs an operation of forcibly terminating this suitability determination or if it is determined a predetermined number of times or more that the suitability is not satisfied. If a moving image is photographed, the determination on whether the desired suitability is satisfied is triggered by a predetermined determination start operation by the operator. In this regard, if a moving image is photographed, the determination of the suitability may constantly be made in real time. In this case, the control circuit part 15 extracts the color information of the real image data and the color information including the label of the print data and calculates and compares the suitability of these two pieces of the color information every moment (whether the label L is conspicuous against a background wall or object in a mode in which such a combination is desired or whether the label L is buried in a background wall or object in a mode in which such a combination is desired), so that the determination can be made.

The flow goes to step S18, and the control circuit part 15 notifies the operator that the desired suitability is satisfied, and terminates this routine. A technique of the notification may include displaying the message M of the notification on the display screen of the display part 13, sounding of a voice, etc. Specifically, when a determination result related to the suitability reaches a certain threshold value or more, it is considered that "this is the best place to paste this label!", and a notification is immediately made at this time point by a display of "this is the best place for your label" etc. on a smartphone screen, a blinking of the label virtual image, a voice, or vibrations. It is noted that even if it is determined at step S17 that the suitability is not satisfied, a notification can successively be made by a message etc. to indicate that the label L is not suitable in this place.

This allows the operator to recognize the optimal place to paste the label. In this case, the determination of the suitability between the virtual label LI and the object may include a color change associated with light and shade as the color of the background, i.e., the object to be affixed. For the color of the label L, a color of ink used for print formation on the label L may be taken into consideration in addition to the color of the print-receiving tape 35. The color information of the determination method is calculated by using RGB values. In this case, the determination of the suitability may be made in accordance not only with a simple hue but also with a hue corresponding to a time zone, season, etc. As a result, for example, a hue giving a positive feeling differs even between a label of a dish served in a breakfast buffet of a hotel and a label of the same dish served at night. Therefore, such a condition may be included in criteria for determination.

Furthermore, it is assumed that the determination of the suitability is made in accordance with the use purpose of the label L, for example, when it is desired to make the label conspicuous against the background, and conversely, when it is desired to bury the label in the background as inconspicuous as possible. For example, when the print contents are characters such as "don't forget to take your umbrella with you!" and the color of the tape is blue, the object suitable for the blue can be searched for to determine the suitability including not only the place but also an image corresponding to the purpose.

When it is desired to make the label conspicuous against the background, the suitability can be determined based on whether a difference between the background color (RGB value) and the tape color (RGB value) is equal to or greater than a predetermined threshold value set considerably large. Conversely, when it is desired to bury the label L in the background as inconspicuous as possible, the suitability can be determined based on whether a difference between the background color (RGB value) and the tape color (RGB value) is within a predetermined range (e.g., equal to or greater than a predetermined threshold value close to zero and equal to or less than a significantly small threshold value larger than the predetermined threshold value). It is noted that the determination may be made based on the combination of color coordination described above. Therefore, such a suitability determination can be applied to the already produced print data R in general, i.e., not only to "searching for the background suitable for the label L" but also to a technique of "searching for the label suitable for the background".

Furthermore, relative sizes of the object to be affixed and the label L can also be used as a factor in the determination of the suitability in terms of conspicuousness and inconspicuousness. In particular, even the label L of the same size becomes conspicuous when pasted in a narrow space and becomes less conspicuous when pasted in a large space. Therefore, such an area ratio between the object and the label L etc. can be included in the determination conditions.

The ranging part 17 measures a distance between the portable terminal 10 and the object by a known distance measurement technique such as a light sensor, for example, and acquires from the angle of view the actual size of the object, such as external dimensions and recess and protrusion shapes. Therefore, the control circuit part 15 may display the virtual label LI at a magnification ratio changed in accordance with the acquired external dimensions etc. of the object.

As described above, the portable terminal 10 executes step S12 of generating virtual image data, step S13 of acquiring real image data of a desired field of view photographed by the imaging part 12, step S14 of combining the acquired real image data and the generated virtual image data to generate composite image data, step S15 of outputting the generated composite image data to the display part 13 for superimposing and displaying a virtual label LI in the image of the desired field of view on the display part 13, step S17 of determining whether a desired suitability is satisfied between an exterior appearance of a background object included in the desired field of view and the exterior appearance of the label L based on the acquired real image data and the generated virtual image data, and step S18 of making a predetermined suitability notification (display on the display part 13; voice notification; vibration notification) if it is determined that the suitability is satisfied.

Therefore, the virtual label display process program is used for finding a most suitable place to paste the label L to be produced by the operator. In particular, when the virtual label display process program is executed by the control circuit part 15 of the portable terminal 10, the virtual image data is first generated. This data may reflect a result of an editing operator performed on an appropriate editing screen through the touch panel of the display part 13 by the operator or may be the print data of the label L completed in advance, for example. When the operator then photographs a desired field of view with the imaging part 12 of the portable terminal 10, the real image data corresponding to the photographed result is acquired. As a result, the virtual image data and the real image data are combined and the composite image data is output to the display part 13. Therefore, the virtual label LI is displayed in an overlapped state in the image of the desired field of view on the display part 13, so that the operator can easily have a visual image of a virtual appearance form when the label L is attached to the object to be affixed (background object) in the image of the field of view.

As described above, the portable terminal 10 can determine the desired suitability between the exterior appearance of the object to be affixed and the exterior appearance of the label L pasted thereon. It is conceivable that examples of the suitability include whether the label L looks clearly floating up when the label L is attached to the object to be affixed (an increased degree of clarity as a feeling of sharpness) or, conversely, whether the label L looks moderately buried when the label L is attached to the object to be affixed (a degree of being buried as a feeling of inconspicuousness, in other words, a decreased degree of clarity), etc. Based on the real image data and the virtual image data, it is determined whether the desired suitability is satisfied. If the determination is affirmative, a suitability notification is made to notify the operator that the suitability is satisfied.

As a result of the process as described above, the operator can move the portable terminal 10 or move around with the portable terminal 10 held by hand to take images of various places while displaying the virtual label LI to be produced displayed on the display part 13, so as to find the most suitable place to paste the label L. Consequently, the convenience for the operator can be improved.

In this case, by generating the composite image data in which the display position of the virtual label LI on the display part 13 is substantially fixed regardless of variation in the field of view, the virtual label LI can be displayed at the same position in the display part 13 without change even when the operator moves the portable terminal 10 or moves around with the portable terminal 10 held by hand to take images so that the field of view displayed on the display part 13 changes every moment.

As indicted by three black dots in FIG. 8B, a triangular positional correlation can be set between the object image PI and the virtual label LI so as to maintain a certain fixed correspondence relationship. In this example, the virtual label LI has the upper left corner of the virtual label LI set in advance as the reference point of the positional correlation (see FIG. 8B). This reference point may be set to an arbitrary position of the virtual label LI through an appropriate operation on the portable terminal 10 by the operator. In the object image PI, the two points of the handle portion of the electric pot P serving as the feature points described above are set as the reference points of the positional correlation (see FIG. 8B). Therefore, even if the object image PI displayed on the display part 13 moves or changes in size due to variation in the field of view imaged by the imaging part 12, the virtual label LI can be moved or changed in size so as to follow the movement and the change. Consequently, even though the label L is not yet attached to the object to be affixed (the electric pot P in this example) in the real world, the display on the display part 13 can virtually achieve the state as if the label L is actually attached to the object. As a result, the form after the attachment can visually be simulated before actually attaching the label L to the object. Additionally, since the virtual label LI can be simulated in various states with different fields of view, the operator can acquire a feeling closer to the actually attached state, and the convenience can be improved.

Additionally, since the suitability is determined based on the color information of a predetermined range (affixing position) narrower than the desired field of view and including the object to be affixed in the real image data and the color information of the virtual image data, the determination of the suitability can be performed through a numerical arithmetic process by using RGB values etc. as the color information, for example.

By determining as the desired suitability at least whether an increased degree of clarity (a feeling of sharpness) of the label L is equal to or greater than a predetermined threshold value when the label L is attached to the object to be affixed, the optimal place can be found such that the label L to be produced by the operator looks clearest when pasted.

Conversely, by determining as the desired suitability at least whether a degree of being buried, i.e., a decreased degree of clarity (a feeling of inconspicuousness), of the label L is within a predetermined range when the label L is attached to the object to be affixed, the optimal place can be found such that the label L to be produced by the operator looks moderately buried when pasted.

In this way, by causing the control circuit part 15 to further execute step S16 of accepting selection input of contents of the desired suitability via the touch panel of the display part 13 so as to determine whether the accepted desired suitability is satisfied between the exterior appearance of the object to be affixed and the exterior appearance of the label L, the operator can selectively input, for example, whether to search for the place in which the label L to be produced looks clearest when pasted, or whether to search for the place in which the label L to be produced looks moderately buried when pasted.

The control circuit part 15 generates the composite image data on the basis of the exterior appearance of the object to be affixed based on the real image data by combining and superimposing the virtual image data in a form having the exterior appearance size of the label L changed in magnification ratio with the real image data and, therefore, for example, when the label L should better be changed in magnification ratio (enlarged or reduced) so as to satisfy the desired suitability (desired to make the label conspicuous or moderately buried) because of the color and the shape of the object to be affixed, the control circuit part 15 can make the operator visually recognize this fact.

Moreover, by causing the control circuit part 15 to further execute step S11 of accepting an editing operation to the print contents of the label L so as to generate virtual image data reflecting the accepted editing operation, the virtual label LI can be displayed in the display part 13 in the form reflecting the result of the editing operation performed by the operator for the print displayed on the label L.

Particularly, in this embodiment, the operator can perform the editing operation on the layout screen (see FIG. 6) displayed on the display part 13 so as to set the form of the label L such as the print RR etc. as desired. As a result, the virtual label LI corresponding to the label L having the print RR etc. set as desired by the operator in this way can be displayed in the state of being virtually attached to the object (before actually producing the label L).

In the example used in the above description, the object to be affixed (the electric pot P in this example) is photographed by the portable terminal 10 while taking an image with the imaging part 12, so as to generate the virtual label LI based on the print data R for the label L produced in advance and to find the suitable place to paste the virtual label L (see FIGS. 8A and 8B).

However, the present disclosure is not limited thereto and, for example, the print data R produced in advance is not limited to one data. In particular, the print data R may be produced in some cases for a plurality of types of the label L such that the label L is changed in size, color, character color, etc., although the contents to be printed are completely the same. In such a case, when the desired place for pasting the label L is already determined and the operator photographs the place with the portable terminal 10, the virtual labels LI based on the already produced print data R are listed beside the photographed background image displayed on the screen of the display part 13, instead of the color selection icons AC described above. When one label is selected from the list, the selected virtual label LI is superimposed and displayed in real time with the object image PI serving as the background. When another tape is selected, the selected virtual label LI is replaced. This may be repeated to allow the control circuit part 15 to determine the suitability with the virtual label LI of the tape color most suitable for pasting in the place.

Description will specifically be made of an example of determining the already produced label L having the suitable color after the operator first determines the place to paste the label L.

In this case, a place (a wall, an object, a device, etc.) to paste the label L is photographed by the portable terminal 10 and the photographed image is displayed on the screen of the display part 13.

Subsequently, the operator appropriately operates the portable terminal 10 to display a list of the virtual labels LI corresponding to a plurality of types of the labels L stored in advance in the storage part 16 on the screen of the display part 13 (the list is displayed in a separate frame without overlap with the object image PI or may be displayed in an overlapping manner).

The operator then selects a sample of one of the labels L listed on the screen of the display part 13 and the control circuit part 15 switches the display of the corresponding virtual label LI to the center on the screen. As a result, virtual overlapping display is performed in real time as if the label L is pasted on the object image PI and the suitability can be determined at the same time.

The arrows shown in the block diagram of FIG. 3 show an example of the signal flow and are not intended to limit the signal flow direction.

The routines of the flowchart shown in FIGS. 4 and 9 are not intended to limit the present disclosure to the routines described above, and the procedures may be added/deleted or may have the order changed without departing from the spirit and the technical ideas of the disclosure. For example, the condition setting for the suitability determination shown at step S16 may be accepted at the same time as, or immediately after, the production/editing of the label L at step S11. In other words, this is a routine before determining the suitability by the control circuit part 15 and can be performed at any timing after the acquisition of the print data R.

Figure 10:
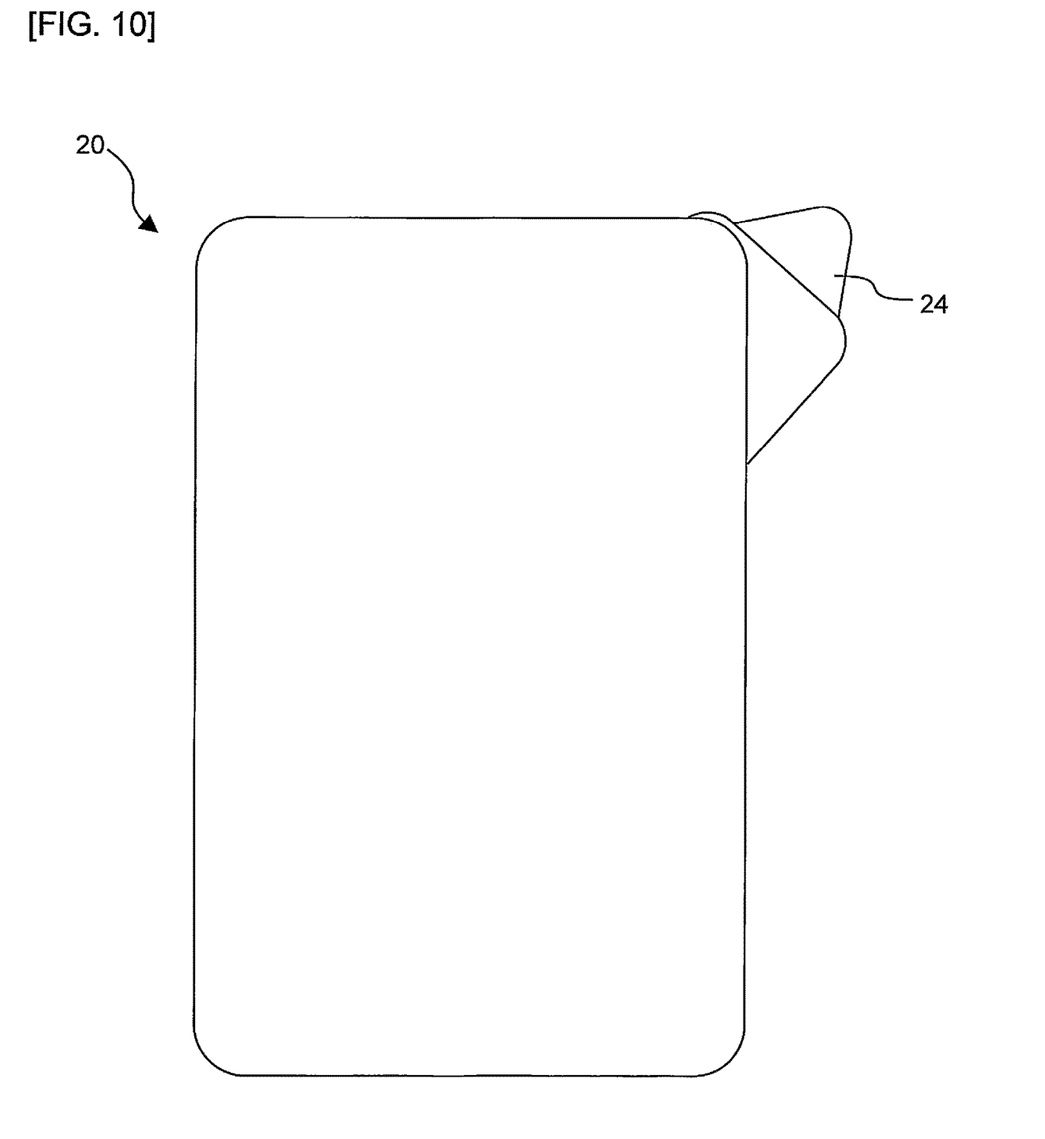
FIG. 10 is a front view showing an exterior appearance of another label producing device that is an operation object of the operation terminal.

The techniques of the embodiment and modification examples may appropriately be utilized in combination other than those described above. The portable terminal 10 is not limited to the smartphone described above as long as the terminal has a camera function, a display function, and a communication function and is excellent in portability and, for example, the portable terminal 10 may obviously be a tablet terminal as well as a digital camera, a digital video camera, etc. Furthermore, as shown in FIG. 10, the touch panel of the display part 13 such as a smartphone, a digital camera, and a digital video camera can be used as the operation part 14 and, therefore, the display part 22 and the operation part 23 of the label producing device 20 can be eliminated.

What is claimed is:

1. A non-transitory computer-readable recording medium capable of reading by a computing part, storing a virtual label display process program for execution on said computing part, the computing part provided in a portable terminal that is configured to operate a label producing device configured to produce an attachable label to be attached to an object to be affixed, the portable terminal including an imaging part, a display part comprising a touch panel function, and the computing part,     the program, when executed by said computing part, causes the computing part to:

display a layout screen that displays print data imitating a printed tape, and a produce label button capable of instructing a produce of said label and a virtual affixing button, wherein the produce label button and the virtual affixing button are buttons respectively operated as switches through said touch panel function on said display part;

generate virtual image data of said label, the virtual image data being for displaying a virtual image of said label on said display part;

output said virtual image data generated to said display part and display a virtual label display screen on said display part, wherein virtual label display screen includes said virtual image of said label and an operation icon capable of instructing a start of photographing of a moving image by said imaging part, wherein said operation icon being as an operation button operated as a switch through said touch panel function;

acquire real image data of a desired field of view that includes said object to be affixed photographed by said imaging part, triggered by instructing the start of photographing of said moving image by said operation icon;

combine said real image data acquired and said virtual image data generated to generate composite image data; and     output said composite image data generated to said display part, and display an affixing position screen that superimposes said virtual image of said label in an image of said desired field of view on said display part,     said display part is switched from said layout screen to said virtual label display screen, by means of operating said virtual affixing button in said layout screen,     said display part is switched from the display state displaying said virtual label display screen to a display state displaying said affixing position screen, by means of operating said operation icon in said virtual label display screen,     said virtual image of said label is continuously displayed and maintained in a desired size in said affixing position screen, in the case that a positional relationship of said portable terminal with said object to be affixed changes and a position and a size of a real image of the object to be affixed displayed in said image of said desired field of view changes in real time.

2. The recording medium according to claim 1, wherein said virtual label display screen displayed includes said virtual image of said label with the desired size, and in said affixing position screen displayed, said virtual image of said label with the desired size is superimposed in said image of said desired field of view.

3. The recording medium according to claim 1, wherein in said affixing position screen displayed on said display part after the start of photographing of said moving image is instructed by said operation icon, a mark indicating the photographing by said imaging part is displayed during the photographing.

4. The recording medium according to claim 1, wherein in said affixing position screen displayed on said display part after the start of photographing of said moving image is instructed by said operation icon, said virtual image of said label is included in a central part in the vertical direction.

5. The recording medium according to claim 1, wherein in said virtual label display screen displayed on said display part after an operation of said virtual affixing button, said virtual image of said label is included in a central part in the vertical direction.

6. The recording medium according to claim 1, wherein said virtual image of said label is displayed with said desired size that is maintained both in said virtual label display screen and said affixing position screen switched from said virtual label display screen.

\* \* \* \* \*